United States Patent [19]

Onoe

[11] 4,314,249
[45] Feb. 2, 1982

[54] RADAR REFLECTOR WITH VARIABLE ELECTRIC REFLECTIVITY

[76] Inventor: Morio Onoe, 4-9-7 Taishido, Setagaya-ku, Tokyo, Japan

[21] Appl. No.: 167,783

[22] Filed: Jul. 11, 1980

[30] Foreign Application Priority Data

Jul. 11, 1979 [JP] Japan ................................ 54/88520

[51] Int. Cl.³ ............................................ H01Q 15/00
[52] U.S. Cl. ................. 343/18 D; 343/6.8 R
[58] Field of Search ......................... 343/18 D, 6.8 R

[56] References Cited

U.S. PATENT DOCUMENTS

| | | | |
|---|---|---|---|
| 3,158,862 | 11/1964 | Chisholm | 343/18 D |
| 3,703,723 | 11/1972 | Albanese et al. | 343/18 D |
| 3,896,440 | 7/1975 | Wheeler | 343/18 D |

FOREIGN PATENT DOCUMENTS 53-21633 7/1978 Japan.

Primary Examiner—T. H. Tubbesing
Attorney, Agent, or Firm—Joseph W. Molasky

[57] ABSTRACT

A radar reflector which reradiates identification and other information to a radar station upon reception of electromagnetic radar waves therefrom. The reflector is composed of plural metallic reflector plates isolated from one another with respect to the direct current and integrally formed with bosses with switching diodes arranged intermediate adjoining ones of these bosses and connected for bridging adjoining ones of the plates. The bias voltage to be applied to all of the switching diodes is controlled according to the information to be retransmitted for switching the reflector between the mode of reflection and retransmission.

3 Claims, 5 Drawing Figures

RADAR REFLECTOR WITH VARIABLE ELECTRIC REFLECTIVITY

SUMMARY OF THE INVENTION

This invention relates to a reflector adapted for responding upon reception of electromagnetic radar waves transmitted from a radar station. More particularly, it relates to such reflector in which retransmission of identification or other brief information is made by changing the reflectivity of the reflector with regard to the electromagnetic waves between two states corresponding to binary "1" and "0" of the coded information to be retransmitted to the radar station.

An advantage of the present invention is that, since the reflector itself can transmit the response information but is not in a position to radiate electromagnetic waves, it does not interfere with other communication and can be used simultaneously by any radar stations having decoding means for decoding the response information.

DESCRIPTION OF PREFERRED EMBODIMENTS

Figure 1:
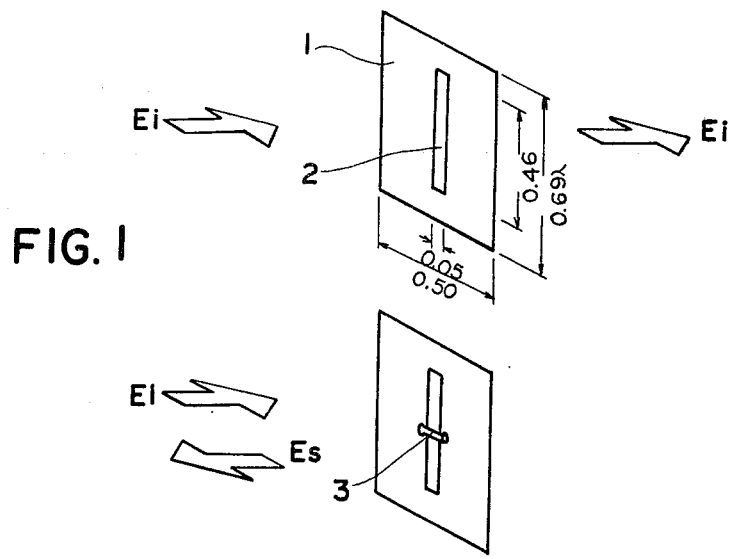
FIG. 1 shows the basic principle of the variable reflectivity element of the present invention.

FIG. 1 shows the principle of a variable reflectivity element of the present invention. The upper portion of FIG. 1 shows a metallic plate 1 about one wavelength long and provided with a resonance or tuning slot, whereas the lower portion of FIG. 1 shows the same plate in which the slot is shorted centrally by a shorting piece 3. If the slot 2 has a length specifically related to the frequency of the radar wave used, in case of incidence of the radar wave Ei, having its plane of polarization coincident with the general plane of the slot 2, from the direction perpendicular to the plane of the reflector plate 1, almost no waves are reflected by the plate 1. FIG. 1 also shows typical sizes for the plate 1 and the slot 2. In a manner well-known in the art, the slot length to be tuned to a certain frequency is not changed appreciably with changes in the reflector plate size, but the amount of reflected waves will increase with an increase in the plate size. If the slot size is changed for the same radar wave frequency, by shorting the slot centrally with a shorting piece, the slot is detuned, and the waves Ei are reflected as reflected waves Es in the incident direction with an amplitude corresponding to the surface measure of the reflector plate. Thus, by selective electrical shorting or not shorting of the central portion of the tuning slot provided in the reflector plate 1, the incident waves Ei from the direction perpendicular to the reflector plate surface may be reflected back in the incident direction, or further radiated from the rear face of the plate, respectively. Such selective reflection or further radiation may be made to correspond to the binary "0" or "1" in a well-known manner.

Figure 2:
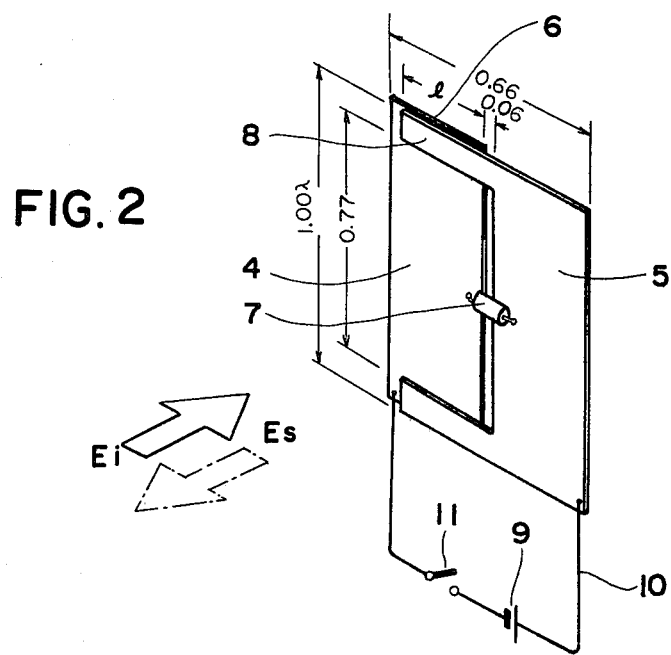
FIG. 2 is a perspective view showing the variable reflectivity element of the present invention composed of two reflector plates and a switching diode connected for bridging a slot defined by said plates.

FIG. 2 shows a variable reflectivity element of the present invention for realizing the basic principle of the invention as described with reference to FIG. 1. In this embodiment, a switching diode, e.g., MA 47123 manufactured by Microwave Associates located at Burlington, Mass., is used for selective shorting or non-shorting of the tuning slot. In the Figure, a rectangular metallic plate 4 is partially superimposed on a U-shaped metallic plate 5 with a gap 6 between the plate 4 and both arms of the plate 5. A tuning slot is defined between the plates 4 and 5 as shown. The gap 6 is used for connecting the plates 4 and 5 with regard to high frequency waves but these plates are disconnected from one another with direct current. A switching diode 7 is connected between the plates 4 and 5 at the center of the slot 2 and it is shorted or rendered conductive upon closure of a switch 11 connected in series with an electrical source 9 and to both said plates 4 and 5 by means of a conductor 10. At this time, two equivalent tuning slots are formed on both sides of the now shorted diode 7. These slots can be tuned to the specific frequency of the radar wave used by suitably selecting the length l of the two arms 8 of the U-shaped plate 5 that cooperate with the plate 4 for establishing the above gap 6. At this time, the waves Ei incident from the direction perpendicular to the reflector plate surface may be reradiated from the rear face of the reflector without any substantial reflection of the received radar waves at the front face of the reflector plate. If the diode 7 is turned off, the slot size is doubled and hence detuned to the radar wave frequency, with resulting reflected waves Es in an amount proportional to the surface measure of the reflector plate.

Figure 3:
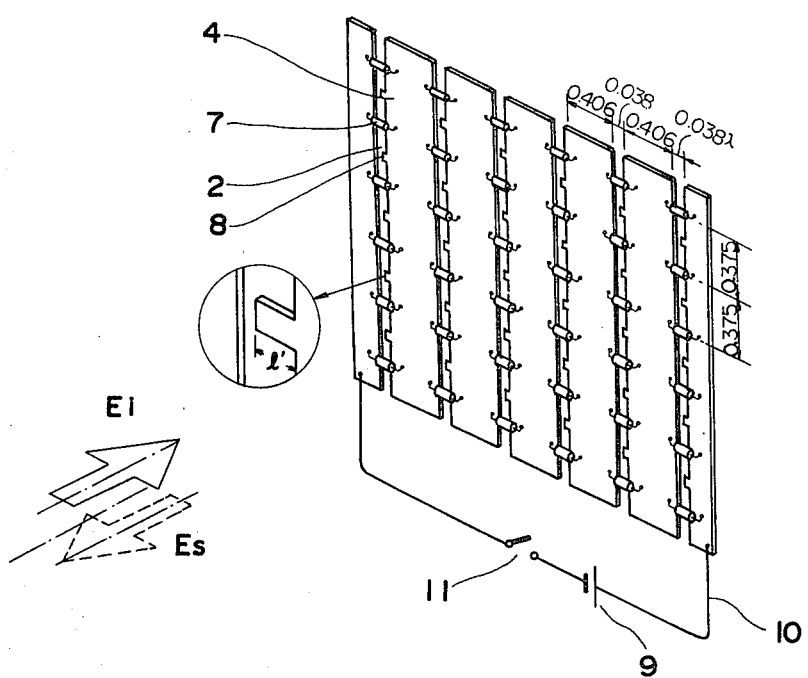
FIG. 3 is a perspective view showing schematically an assembly composed essentially of the elements such as shown in FIG. 2 making up a practically usable reflector.

In this way, according to the basic principle of the present invention, a metallic reflector plate 1 is formed with a resonance slot 2, or the two metallic plates 4, 5 are replaced with a small air gap so as to define a slot therebetween. These slots may be shorted or not by a shorting piece so as to be tuned or detuned with respect to the specific frequency of the radar waves used, thus providing two variable values of the reflectivity of the reflector plate. These values may be made to correspond to two binary states "0" and "1". This basic principle of the present invention may be utilized advantageously in the construction of a radar reflector responsive upon reception of radar waves. Thus, a radar reflector plate may be constructed from an assembly consisting essentially of a number of the elements described above so that the reflector plate as a whole has a sufficient surface measure to receive and reflect the radar waves back to the transmitting station for identification or observation purposes. FIG. 3 shows an example of such an assembly composed essentially of variable reflectivity elements. A plurality of rectangular metallic reflector plates 4 are arranged in a side-by-side relation and a number of switching diodes, e.g., MA 47123 manufactured by Microwave Associates located at Burlington, Mass., are also mounted at fixed intervals for connecting the two adjoining plates. Bosses 8 are formed integrally with the plates so as to be disposed centrally between two adjoining diodes 7. The length l of each such boss 8 may be selected in advance so that the two adjoining plates may be connected to each other with respect to the high frequency radar waves but disconnected from one another with respect to the direct current applied from the source 9. As in the preceding example, the size of a slot defined between any two adjoining bosses 8 is detuned to the radar wave frequency when the diode 7 associated therewith is not shorted and is tuned thereto when the said diode 7 is shorted. A sufficiently practical or satisfactory tuning state may be obtained by suitably selecting the boss length l. Such shorting of all of the diodes 7 in the array of FIG. 3 may be attained simultaneously by closing the switch 11 connected in series with the source 9 and to both end plates 4 by means of a conductor 10. With the diodes 7 thus shorted, tuning slots are defined between any two adjoining diodes 7, resulting in suppression of wave reflection and in re-radiation of the incident waves from the rear face of the reflector plate. If the switch 11 is opened and hence the diodes 7 do not conduct current, the plates 4 will become reflector plates resulting in the generation of reflected waves Es.

In the arrangement of FIG. 3, the slots defined by adjoining bosses 8 associated with the same two plates 4 are tuned and detuned to the radar wave frequency when the diodes connected therebetween are rendered conductive and nonconductive, respectively. It is however possible to have the above slots tuned and detuned to the radar wave frequency when the diodes are rendered nonconductive and conductive, respectively, in the same manner as in the basic element shown in FIG. 1.

Figure 4:
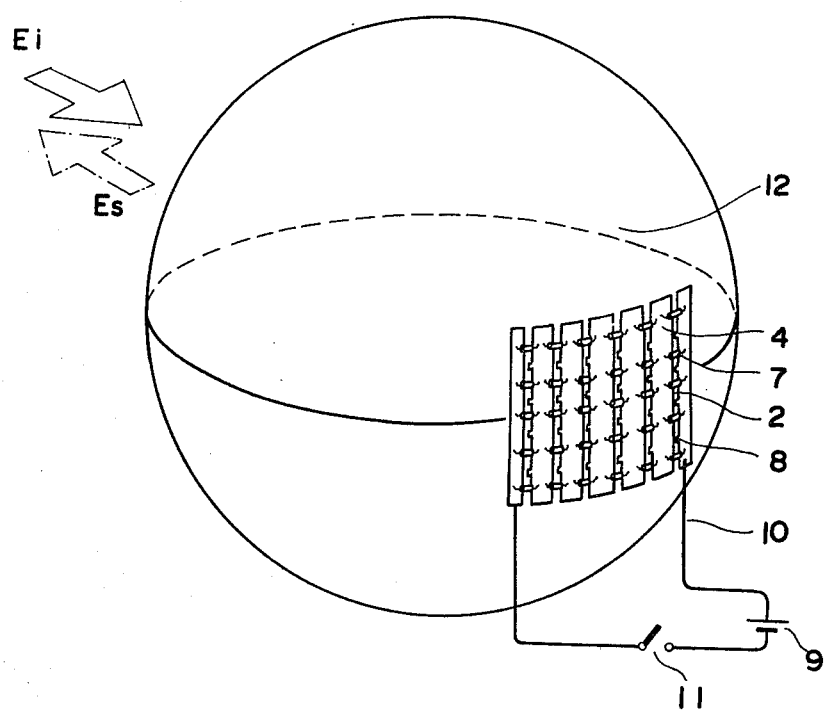
FIG. 4 is a perspective view of the assembly of FIG. 3 fitted to a spherical electromagnetic lens for providing wide angle response capability.

The array shown in FIG. 3 may be used only where the information transmitting radar station is situated in a specific relation with respect to the array surface. In case of a mobile station, response capability over a wider angle may be required. This requirement can be met by arranging the array as shown in FIG. 4 on a focal plane of a spherical electromagnetic lens (Luneberg lens). As in the preceding example shown in FIG. 3, rectangular reflector plates 4 are arranged at fixed intervals on a focal plane of the spherical lens 12 and a number of switching diodes 7 are placed for briding the gap between adjoining plates 4. A number of bosses 8 are also placed as shown. The length of the boss 8 may be selected in advance for connection and disconnection between adjoining plates with respect to high frequency radar waves and direct current respectively and also for providing a sufficiently practical tuning state upon closure of a switch 11, which is connected in series with an electrical source 9 by a conductor 10 which in turn is connected to both end plates 4. As shown, the waves Ei incident from a direction directly opposite to the array with respect to the center of the lens 12, are focussed by the lens 12 on the array of plates 4. If the diodes are not conducting, that is, not shorted, the waves are reflected at the reflector towards the radar station. If the diodes 7 are conducting, that is, shorted, the incident waves Ei are not reflected at the reflector plate surface, but are further radiated from the rear surface of the array of plates 4.

Figure 5:
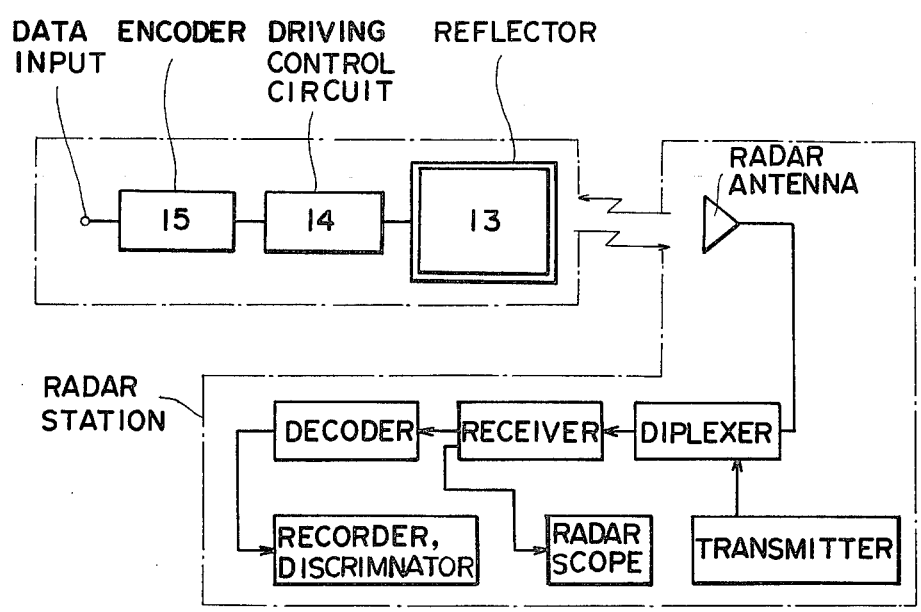
FIG. 5 is a block diagram of a radar transmission system in which the inventive reflector is used for the purpose of information transmission.

FIG. 5 is a block diagram of a radar system adapted for information transmission from the inventive reflector back to a radar station. The switching diodes of the inventive reflector, that is, the array of the reflector plates as shown in FIGS. 3 and 4, are connected to a driving control circuit 14 and thence to an encoder 15. The information to be conveyed to the radar station is supplied as input to the encoder 15. Such information may be identification signals for a vessel equipped with the inventive reflector or, in the case of the reflector used as a navigational aid, the direction and distance of which are known with respect to the transmitting station, temperature or other environmental data measured at the detector site with the aid of thermistors or similar temperature responsive devices. The environmental data may be combined with identification data as the occasion may demand. The input information is coded in the encoder as a series of digital coded signals which are then converted in the control circuit 14 into a series of interrupted bias voltages for the diodes for controlling the reflectivity of the reflector array between two values corresponding to binary "0" and "1". Thus, as the electromagnetic waves are applied from the radar station to the array of reflector plates, the reflected waves therefrom are modulated in their intensity according to the coded information to be transmitted to the radar station. The information signals are then received and decoded at the radar station.

It is to be noted that the present invention is not limited to the specific embodiments described in the foregoing, but may comprise many other modifications.

What is claimed is:

1. A radar reflector adapted for retransmission of response information to a radar station upon reception of electromagnetic radar waves therefrom, said reflector comprising a plurality of metallic reflector plates arranged in parallel and in a side-by-side relation to one another, said plates each being integrally formed with bosses at fixed intervals projecting towards an adjoining one of said reflector plates, each of said bosses defining with said adjoining one of said reflector plates a gap adapted for isolating the associated plates from each other with respect to direct current and connecting said associated plates to each other with respect to the high frequency of the electromagnetic radar waves, a plurality of switching diodes electrically connected between adjoining ones of said reflector plates and intermediate adjoining ones of said bosses associated with the same two plates, a bias source, a switch connected in series with said source, and conductor means connected to said series circuit of said source and switch and to two of said plates, the size of each slot defined by two adjoining ones of said bosses associated with two adjoining plates and by said two adjoining plates being selected to be tuned to the specific frequency of the radar waves upon closure of said switch with consequent current conduction through all of said switching diodes and detuned to said specific frequency upon opening of said switch with consequent interruption of said switching diodes, the electromagnetic radar waves incident on the radar reflector being reflected back in the incident direction or reradiated further from the rear surface of the reflector when the slots of the reflector are tuned or detuned to said specific frequency respectively.

2. A radar reflector adapted for retransmission of response information to a radar station upon reception of electromagnetic radar waves therefrom, said reflector comprising a plurality of metallic reflector plates arranged in parallel and in a side-by-side relation to one another, said plates each being integrally formed with bosses at fixed intervals projecting towards an adjoining one of said reflector plates, each of said bosses defining with said adjoining one of said reflector plates a gap adapted for isolating the associated plates from each other with respect to direct current and connecting said associated plates to each other with respect to the high frequency of the electromagnetic radar waves, a plurality of switching diodes electrically connected between adjoining ones of said reflector plates and intermediate adjoining ones of said bosses associated with the same two plates, a bias source, a switch connected in series with said bias source, and conductor means connected to said series circuit of said source and switch and to two of said plates, the size of each slot defined by two adjoining ones of said bosses associated with two adjoining plates and by said two adjoining plates being selected to be tuned to the specific frequency of the radar waves upon opening of said switch with consequent current interruption through all of said switching diodes and detuned to said specific frequency upon closure of said switch with consequent current conduction through all of said switching diodes the electromagnetic radar waves incident on the radar reflector being reflected back in the incident direction or reradiated further from the rear surface of the reflector when the slots of the reflector are tuned or detuned to said specific frequency respectively.

3. The radar reflector as claimed in claims 1 or 2 wherein the reflector is mounted in its entirety on the focal plane of a Luneberg lens.

* * * * *